(12) United States Patent
Vogt et al.

(10) Patent No.: US 11,560,954 B2
(45) Date of Patent: Jan. 24, 2023

(54) VALVE

(71) Applicant: Festo SE & Co. KG, Esslingen (DE)

(72) Inventors: Bernhard Vogt, Tübingen (DE); Stefan Schietinger, Esslingen (DE); Bengt Erich Wunderlich, Ostfildern (DE); Sascho Zadravec, Göppingen (DE); Lukas Grad, Esslingen (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 17/349,392

(22) Filed: Jun. 16, 2021

(65) Prior Publication Data

US 2021/0396320 A1 Dec. 23, 2021

(30) Foreign Application Priority Data

Jun. 17, 2020 (DE) .......................... 102020207475.5

(51) Int. Cl.
*F16K 7/16* (2006.01)
*F16K 7/17* (2006.01)
*F16K 11/052* (2006.01)

(52) U.S. Cl.
CPC .............. *F16K 7/17* (2013.01); *F16K 11/052* (2013.01); *F16K 7/16* (2013.01); *Y10T 137/86847* (2015.04)

(58) Field of Classification Search
CPC ..... Y10T 137/87716; Y10T 137/86831; Y10T 137/86847; F16K 11/0525; F16K 11/022; F16K 7/016
See application file for complete search history.

(56) References Cited

U.S. PATENT DOCUMENTS

| 1,782,578 A | * | 11/1930 | Mccune | F16K 7/16 |
| | | | | 251/295 |
| 5,027,857 A | * | 7/1991 | Champseix | F16K 7/16 |
| | | | | 251/303 |

(Continued)

FOREIGN PATENT DOCUMENTS

| AT | 407431 B | 3/2001 |
| DE | 3871536 T2 | 5/1993 |

(Continued)

*Primary Examiner* — Robert K Arundale
(74) *Attorney, Agent, or Firm* — Hoffmann & Baron, LLP (57) ABSTRACT

A valve for controlling a fluid flow, including a valve housing, which is provided with a first fluid connection, a fluid channel and a second fluid connection, further including a valve member which is pivotally mounted in the fluid channel, and a drive for introducing a movement onto the valve member, the valve member having a rigid carrier and a flexible membrane with a sealing region which is provided for a sealing abutment against a valve seat and which is fixed to the carrier and to the valve housing by a circumferentially formed fastening region, wherein a deformation region of the flexible membrane is located between the sealing region and the fastening region and is arranged between a first deformation plane and a second deformation plane, the first deformation plane and the second deformation plane each being aligned parallel to a pivot axis determined by the pivot pin and delimiting a deformation space, and wherein the pivot pin is accommodated at least partially in the deformation space.

13 Claims, 8 Drawing Sheets

(56) References Cited

U.S. PATENT DOCUMENTS

| | | | | |
|---|---|---|---|---|
| 5,205,323 A * | 4/1993 | Baker | ................... | F16K 31/105 |
| | | | | 251/129.2 |
| 6,220,299 B1 * | 4/2001 | Arvidsson | ................. | F16K 7/16 |
| | | | | 137/329.05 |
| 8,434,514 B2 * | 5/2013 | Bezold | ................. | F16K 11/022 |
| | | | | 137/625.65 |
| 2016/0334024 A1 * | 11/2016 | Futamata | .............. | F16K 25/005 |
| 2017/0254435 A1 * | 9/2017 | Ohta | ...................... | F16K 31/06 |

FOREIGN PATENT DOCUMENTS

| | | | |
|---|---|---|---|
| DE | 68908036 T2 | 11/1993 | |
| DE | 69819715 T2 | 4/2004 | |
| JP | 2005163924 A | 6/2005 | |

* cited by examiner

VALVE

BACKGROUND OF THE INVENTION

The invention relates to a valve for controlling a fluid flow, comprising a valve housing which is provided with a first fluid connection and with a second fluid connection and with a fluid channel between the first fluid connection and the second fluid connection, further comprising a valve member, which is pivotably mounted with a pivot pin in the valve housing between a sealing position and a release position, and with a drive for introducing a movement onto an upper side of the valve member, wherein the valve member comprises a rigid carrier and a flexible membrane which is connected or fixed by a sealing region to an underside of the carrier, which underside is oriented opposite to the upper side of the carrier and which flexible membrane is connected or fixed to the valve housing by a circumferential fastening region, wherein a deformation region of the flexible membrane is formed between the sealing region and the circumferential fastening region of the flexible membrane, wherein the sealing region is provided for a sealing abutment against a valve seat formed in the fluid channel opposite the underside of the carrier when the valve member is in the sealing position.

From DE 698 19 715 T2, a valve having an inlet and at least two outlets for a fluid such as a liquid or a gas is known, each of said outlets being provided with a valve seat associated with a membrane adapted to cooperate with said valve seats, said membrane having a dimension larger than that necessary to bear on each of said valve seats. Further, an actuating arrangement is provided for actuating the membrane so that the membrane bears on the valve seats for selective operation of the valve. In this regard, the membrane is configured such that when it is engaged with one of the valve seats, it is disengaged from the other of the valve seats. In addition, an activation arrangement is provided for displacing the membrane such that a new, at least partially unused portion of the membrane is exposed to the valve seat engaged with the membrane.

SUMMARY OF THE INVENTION

The object of the invention is to provide a valve that can withstand a large number of switching cycles.

This task is solved for a valve of the type mentioned above in that the deformation region is arranged between a first deformation plane and a second deformation plane, the first deformation plane and the second deformation plane each being aligned parallel to a pivot axis determined by the pivot pin and delimiting a deformation space, and in that the pivot pin is accommodated at least partially in the deformation space. The deformation region of the flexible membrane is the area which is elastically deformed to the greatest extent during a pivoting movement of the carrier between at least one sealing position and at least one release position. The deformation region is with regard to profiling and/or selection of a material thickness for the flexible membrane. The first deformation plane and the second deformation plane are both determined in exactly one position of the valve member, for example in the at least one sealing position or in the at least one release position or in an intermediate position between the sealing position and the release position. It is provided that the first deformation plane, which is aligned parallel to the pivot axis of the support member, abuts against an upper side of the flexible membrane in such a way that the flexible membrane is only touched, but not cut. Similarly, it is provided that the second deformation plane, which is aligned parallel to the pivot axis of the carrier, abuts against a lower side of the flexible membrane facing away from the upper side of the flexible membrane in such a way that the flexible membrane is only touched, but not cut. Preferably the first deformation plane and the second deformation plane are aligned parallel to each other. In this case, an upper side of the deformation space is bounded by the first deformation plane and a lower side of the deformation space is bounded by the second deformation plane. For example the pivot pin is integrally formed on the carrier or on the valve housing and forms a pivot joint with at least one bearing recess, with which the desired pivot mounting of the valve member relative to the valve housing can be realized. Together with the at least one bearing recess, the pivot pin determines a pivot axis for the valve member. Preferably, it is provided that the pivot pin or at least a section of the pivot pin has a constant profiling along the pivot axis, in particular along a pin section provided for engagement in the bearing recess. Preferably it is provided that the constant profiling of the pivot pin, when projected onto a projection plane oriented transversely to the pivot axis, intersects a surface area on the projection plane bounded by the first deformation plane and the second deformation plane. This satisfies the requirement that at least this portion of the pivot pin is received in the deformation space.

The embodiments described below are descriptions directed to the same basic construction principles that are also realized in the aforementioned embodiment.

In any case a pivoting movement of the carrier results in a deformation of the sealing area of the flexible membrane which is moved along with the carrier, while the circumferential fastening region of the flexible membrane does not undergo any appreciable movement. It is advantageous if the deformation region has the largest proportion of the elastic deformation of the flexible membrane, therefore the elastic deformation of the flexible membrane is as small as possible to ensure a high number of switching cycles for the valve. Preferably the pivot axis is arranged as close as possible to the flexible membrane in order to keep the elastic deformation of the flexible membrane, in particular in the deformation region, at a minimum level even at the usually very small pivot angles for the valve member, which are typically in the range between 1 degree and 10 degrees.

According to a further embodiment of the valve it is provided that a first fastening plane adjacent to an upper side of the circumferential fastening region and a second fastening plane adjacent to a lower side of the circumferential fastening region of the fastening region, which fastening region is clamped between mutually opposite valve housing parts, delimit a fastening space in which the pivot pin is at least partially accommodated. Like the deformation space, the fastening space is bounded by two planes, preferably aligned parallel to one another, and otherwise extends without further boundaries. The first fastening plane and/or the second fastening plane may intersect with the deformation region and/or with the sealing area of the flexible membrane. Furthermore, in accordance with the deformation space described above, it is provided that the pivot pin is accommodated at least partially in the fastening space. The positioning of the pivot pin in the deformation space can also be described by a projection of the pivot pin and the fastening space onto a deformation plane which is aligned transversely to the pivot axis, the projection of the fastening space being intersected by the projection of the pivot pin.

According to a further embodiment of the valve, it is provided that the sealing area of the flexible membrane comprises a sealing section which, in the sealing position of the valve member, is provided for sealing abutment against the valve seat located opposite the underside of the carrier in the fluid channel and which sealing section is supported on a support surface of the carrier, wherein a support plane determined by the support surface of the carrier intersects the pivot pin. Here it is assumed that the support surface of the carrier is either flat, so that the support plane can be determined unambiguously, or that the support plane is aligned with a curved surface of the support surface in such a way that a sum of all distances of surface portions of the support surface from the support plane is minimal.

According to a further embodiment of the valve, it is provided that corner points of a movement space are determined by a first outer edge of the underside of the carrier when located in the sealing position and by the same first outer edge when located in a release position which means that there is no sealing abutment of the valve member against the valve seat, and by a second outer edge of the underside of the carrier when located in the sealing position and the same second outer edge when located in the release position, and that the pivot pin is located in this movement space or intersects with this movement space.

Both the first outer edge and the second outer edge are edges which separate the underside of the carrier from a side surface of the carrier. The first outer edge and the second outer edge being those edges of the carrier which, on the one hand, are arranged immediately adjacent or directly adjacent to the flexible membrane and, on the other hand, are at a maximum distance from the pivot axis of the valve member. Preferably, the movement space defined by the first outer edge and the second outer edge, respectively in the release position and in the sealing position, has a rectangular cross-section in a projection plane aligned transversely to the pivot axis of the valve member. It is further provided that a projection of the pivot pin, in particular of a pin section that engages in a bearing recess of the valve member, onto the projection plane intersects the movement space.

According to a further embodiment of the valve, it is provided that an orifice of the valve seat defines an orifice plane and that a straight line extending from an intersection of a central axis of the orifice with the orifice plane to a pivot axis of the carrier assumes an angle relative to the orifice plane which angle is smaller than 30 degrees, preferably smaller than 20 degrees, in particular smaller than 15 degrees. According to this embodiment, it is assumed that the valve seat has an orifice and that an orifice plane contacts this orifice with at least three points without intersecting it. Preferably, it is provided that the orifice is at least substantially planar in shape and, in particular, is completely contained in the orifice plane. Preferably, it is provided that the orifice plane is aligned parallel to the pivot axis of the valve member. Furthermore a straight line extends between an intersection of an axis (center axis) of the orifice with the orifice plane and the pivot axis of the carrier. Preferably this straight line is oriented perpendicular to the pivot axis. In particular the straight line is identical with the distance between the intersection and the pivot axis.

According to a further embodiment of the valve, it is provided that the fluid channel is at least partially delimited by a valve housing upper part and by a valve housing lower part, and that the valve seat and a second valve seat are arranged in the valve housing lower part, wherein a third fluid connection is located between the valve seat and the second valve seat and passes through the valve housing lower part starting from the fluid channel. It is preferably provided that the third fluid connection is in permanent fluidic communicating connection with the fluid channel irrespective of the pivot position of the valve member. Particularly preferably, it is provided that the valve member is switchable by the associated drive means between the sealing position, in which the flexible membrane sealingly abuts the valve seat, which also may be named first valve seat, and a fluidically communicating connection is provided between the second fluid connection and the third fluid connection, and the release position, in which the flexible membrane releases the valve seat and sealingly abuts the second valve seat so that there is a fluidically communicating connection between the first fluid connection and the third fluid connection. It is particularly advantageous if the spatial arrangement of the valve seat and the second valve seat is matched to the properties of the valve member, in particular to the properties of the flexible membrane, in such a way that during a pivoting movement of the valve member between the sealing position for the first valve seat and the release position for the valve seat a simultaneous release of the valve seat and the second valve seat is avoided. The sealing position is also the first sealing position, since the valve seat is sealed there, and the release position is also the second sealing position, since the second valve seat is sealed there.

Preferably, it is provided that a first sealing section and a second sealing section are formed on the underside of the carrier. The first sealing section and the second sealing section are arranged in a common sealing plane. Furthermore a protrusion of the carrier is formed between the first sealing section and the second sealing section, which protrusion protrudes above the common sealing plane and which defines a protrusion surface. A distance between the protrusion surface and the pivot pin is at least 50 percent, preferably at least 60 percent, in particular at least 70 percent of a diameter of the pivot pin. With this protrusion, an advantageous flow of force between the valve housing and the valve member is ensured irrespective of whether the pivot pin is formed integrally on the valve member or passes through the valve member as a separate pin and engages in at least one bearing recess of the valve housing. Alternatively the pivot pin is realized as a pin which projects from the wall of the valve housing and engages in a bearing recess of the valve member.

According to a further embodiment of the valve, it is provided that the valve seat and a second valve seat are formed in the fluid channel, wherein a first orifice of the valve seat defines a first orifice plane and wherein a second orifice of the second valve seat defines a second orifice plane and wherein an intersection line of the first orifice plane and the second orifice plane is arranged within a cross section of the pivot pin. According to this embodiment, the first orifice plane is assumed to contact the first orifice of the valve seat, which also may be named first valve seat, and the second orifice plane is assumed to contact the second orifice of the second valve seat. The first orifice plane and the second orifice plane form an obtuse angle, in particular an angle of 175 degrees plus/minus 5 degrees with respect to each other. Preferably, it is provided that the first orifice plane and the second orifice plane are each oriented parallel to the pivot axis of the valve member. It is further provided that an intersection line which is defined by the first orifice plane and the second orifice plane is encompassed by at least that portion of the pivot pin that defines the pivot axis for the pivotal movement of the valve member relative to the valve housing. In particular, it is provided that the intersection line lies in a projection plane which is aligned transversely to the pivot axis, within a projection of that region of the pivot pin on this projection plane which determines the pivot axis. It can also be provided that the first orifice plane and the second orifice plane are aligned parallel to each other, in particular are congruent, in which case the two orifice planes intersect the pivot pin.

It is advantageous if the carrier comprises at least one recess which extends from the underside of the carrier in the direction of the upper side of the carrier and wherein the flexible membrane comprises a retaining web which is received in the recess and/or wherein the flexible membrane comprises a circumferential sleeve which extends from the underside of the carrier in the direction of the upper side of the carrier. Accordingly, starting from the sealing region of the flexible membrane, at least one retaining pin or retaining web is formed which extends in the direction of the upper side of the valve member and is received in a corresponding recess of the carrier, in particular in a form-fitting manner. In addition or as an alternative the flexible membrane comprises a circumferential sleeve which extends from the underside of the carrier in the direction of the upper side of the carrier. The function of the retaining pin or retaining web is to ensure reliable fixing of the flexible membrane to the carrier. The retaining pin or retaining web, starting from the underside of the carrier, has a mushroom-like profile and is thereby positively received with an enlarged head region in a corresponding recess of the carrier. In the case of a retaining pin, it is assumed that this extends in the direction of the pivot axis only over a part of the extension or width of the carrier. In the case of a retaining web, it is assumed that this extends in the direction of the pivot axis over the entire extension or width of the carrier. Supplementary or alternatively, it is provided that the flexible membrane has a sleeve extending from the underside of the carrier in the direction of the upper side of the carrier, which sleeve is preferably formed circumferentially on the carrier in order to permit advantageous force transmission between the carrier and the flexible membrane without undesirable force peaks.

In an advantageous further embodiment of the invention, it is provided that the fastening region bears against a lower side region, preferably of planar design, of an upper valve housing part and against an oppositely arranged upper side region, preferably of planar design, of a lower valve housing part. Furthermore the fastening region is received between the lower side region and the upper side region in a force-fitting manner or in a force-fitting and form-fitting manner.

BRIEF DESCRIPTION OF THE DRAWINGS

An advantageous embodiment of the invention is shown in the drawing. Here shows.

DETAILED DESCRIPTION

Figure 1:
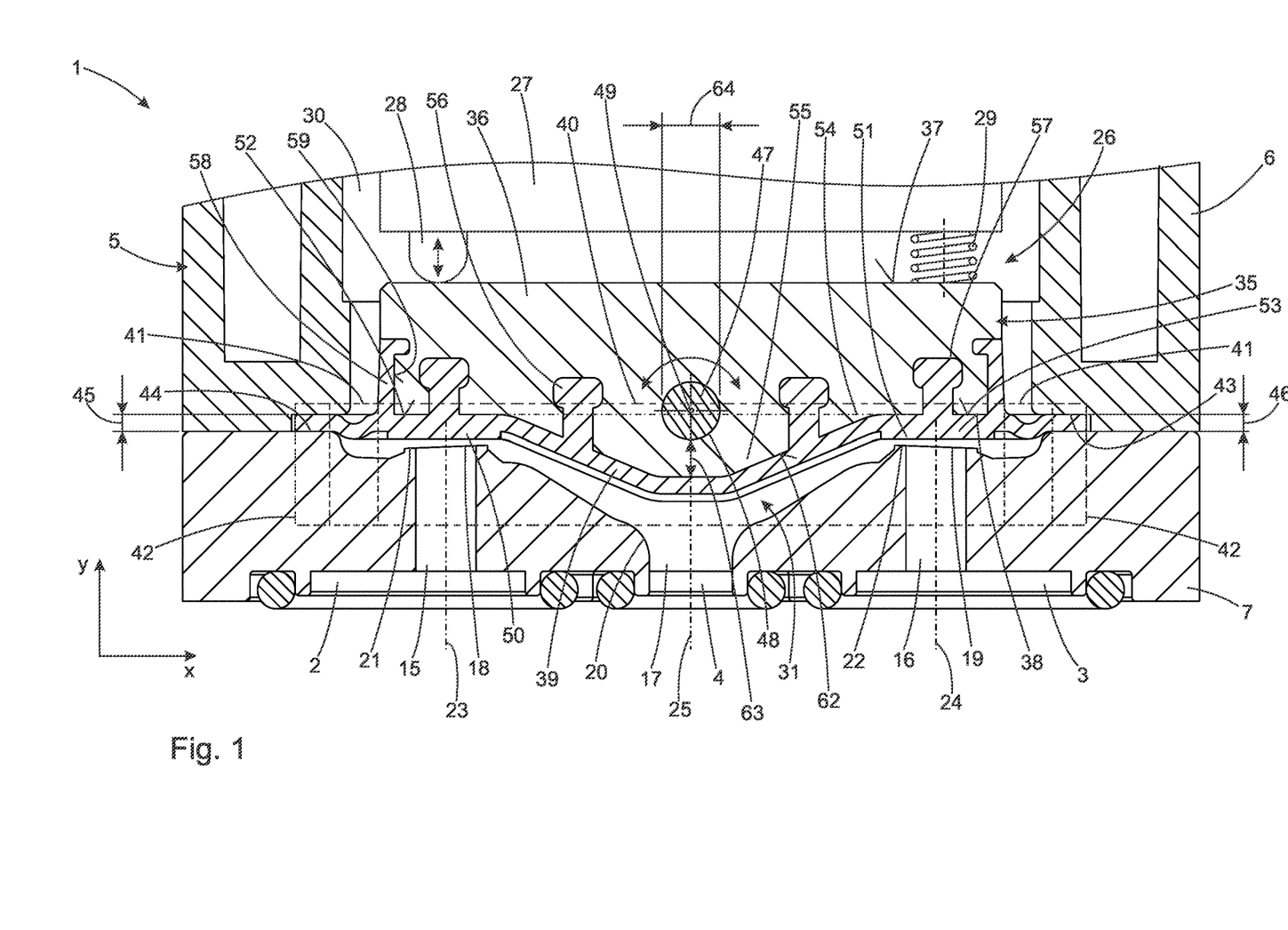
FIG. 1 a sectional view of a partial area of a valve with a valve housing in which several fluid connections, a fluid channel, a valve member and a schematically indicated drive are accommodated, FIG. 2 a perspective view of the valve member according to FIG. 1, FIG. 3 a perspective view of a valve housing lower part of the valve housing shown in FIG. 1, FIG. 4 a strictly schematized representation of a pivot pin of the valve member and a deformation space defined by the valve member, FIG. 5 a strictly schematized representation of a pivot pin of the valve member and a mounting space defined by the valve member, FIG. 6 a strictly schematized representation of a pivot pin of the valve member and a support surface determined by the valve member, FIG. 7 a strictly schematized representation of a pivot pin of the valve member and a movement space defined by the valve member, FIG. 8 a strictly schematized representation of a pivot pin of the valve member and an orifice plane defined by a valve seat, and FIG. 9 a strictly schematized representation of a pivot pin of the valve member and a first orifice plane of a first valve seat and a second orifice plane of a second valve seat.

A valve 1 shown in the sectional view of FIG. 1 serves to control a fluid flow which can be provided at a first fluid port 2, at a second fluid port 3 and at a third fluid port 4. For example the fluid is a liquid or a gas.

The fluid connections 2 to 4 are formed on a valve housing lower part 7 which, together with a directly adjacent valve housing upper part 6, forms a valve housing 5 which is not shown in its entirety and is of purely exemplary cuboidal design. By way of example, it is provided that the valve housing upper part 6 and the valve housing lower part 7 are each formed as plastic injection-moulded parts and are firmly connected to one another by connecting means not shown in more detail, such as latching connections and/or screw connections.

A first fluid bore 15 extends from the first fluid connection 2 to a first orifice 18 which opens into a working chamber 26. The working chamber 26 is delimited by the valve housing upper part 6 and the valve housing lower part 7. In a similar way a second fluid bore 16 extends from the second fluid connection 3 to a second orifice 19 and a third fluid bore 17 extends from the third fluid connection 4 to a third orifice 20. Purely by way of example, it is provided that the first fluid bore 15, the second fluid bore 16 and the third fluid bore 17, each having a bore axis 23, 24, 25, which are aligned parallel to one another. Exemplarily, it is provided that the third fluid bore 17 is arranged, in particular centrally, between the first fluid bore 15 and the second fluid bore 16.

It is further provided that the first orifice 18 is surrounded by an annular plane surface formed on the valve housing lower part 7, which is referred to as the first valve seat 21. Purely by way of example, it is provided that the second orifice 19 is surrounded by an annular planar surface formed on the valve housing lower part 7, which is referred to as the second valve seat 22.

A drive 27, shown only schematically, is arranged in the working space 26. The drive 27 may, for example, be a solenoid coil drive, not shown in more detail, which, when electrical energy is suitably provided, may cause a linear movement of a coupling element 28. This coupling element 28, which is a component of the drive 27, rests, by way of example, against an upper side 37 of a carrier 36 which is also accommodated in the working space 26 as a component of a valve member 35 described in more detail below. It may be provided that the linear movement of the coupling element 28 can be converted into a pivoting movement of the valve member 35 because of the pivotable mounting of the valve member 35 on or in the valve housing 5, in particular on or in the valve housing upper part 6. Furthermore, it can be provided that between the drive 27 and the upper side 37 of the carrier 36, at a distance from the coupling element 28, a prestressed spring 29 is arranged, by means of which a preferred position for the valve member 35, which is not shown in more detail, can be specified.

Fixed to the underside 38 of the carrier 36 is a flexible membrane 39 having a sealing region 40 which abuts the underside 38 of the carrier 36. Adjacent to the sealing region 40 is a deformation region 41 formed circumferentially around the carrier 36. Purely by way of example, the deformation region 41 according to FIG. 1 has a U-shaped profiling in the neutral position of the valve member 35 as shown in FIG. 1. Adjacent to the deformation region 41 is a fastening region 42 formed circumferentially around the deformation region 41. The sealing region 40, the deformation region 41 and the fastening region 42 are each surrounded by a box in dashed lines as shown in the figures, but this box only indicates the positioning of the respective area on the flexible membrane 39 and the extent of the respective area in the x-direction shown in FIG. 1, while the extent of the respective box in the y-direction contains no information about the size of the respective area.

The fastening region 42 is received between the valve housing upper part 6 and the valve housing lower part 7 in a frictionally sealing manner. For this purpose, an underside region 43, which is flat, is formed on an underside of the valve housing upper part 6 and faces the valve housing lower part 7. Furthermore, an upper side region 44, which is flat, is formed opposite the lower side region 43. Exemplarily, the lower side region 43 and the upper side region 44 are oriented parallel to each other. Furthermore, it is provided that a distance 45 between the lower side region 43 and the upper side region 44 is smaller than a material thickness 46 of the fastening region 42, i.e. smaller than a distance between an upper side 60 and an underside 61 of the fastening region 42. Thus, when the valve housing upper part 6 is fixed to the valve housing lower part 7, an elastic deformation of the fastening region 42 is ensured, with which the force-fit fixing of the flexible membrane 39 to the valve housing 5 is achieved.

The flexible membrane 39 separates the working chamber 26 into a functional area 30, in which the drive 27 is accommodated, and a fluid channel 31, which is sealingly separated therefrom and is always in fluidic communication with the third fluid bore 17. Furthermore, the fluid channel 31 is in fluidically communicating connection with the first fluid bore 15 or the second fluid bore 16 depending on the pivot position of the valve member 35.

For example, when the valve member 35 is pivoted counterclockwise from the neutral position as shown in FIG. 1, the valve member 35 assumes a sealing position in which the sealing region 40 sealingly engages the first valve seat 21, thereby interrupting a fluidically communicating connection between the first fluid bore 15 and the fluid channel 31. In this regard, the portion of the sealing region 40 that is provided for abutting the first valve seat 21 is also referred to as the first sealing section 50. When the valve member 35 is pivoted in a clockwise direction according to the embodiment of FIG. 1, the valve member 35 reaches a pivoted position, which is also referred to as a release position, since in this pivoted position the fluidically communicating connection between the first fluid bore 15 and the fluid channel 31 is released. However, in this pivoted position, the sealing region 40 is in sealing contact with the second valve seat 22, thereby interrupting a fluidically communicating connection between the second fluid bore 16 and the fluid channel 31. Thereby, that portion of the sealing region 40 which is provided for abutting against the second valve seat 22 is also referred to as the second sealing section 51. In the case of a valve 1 which has a total of two valve seats 21, 22 in accordance with the representation of FIG. 1, the sealing position can also be referred to as the first sealing position and the release position can also be referred to as the second sealing position.

In order to be able to ensure the above-described pivoting movements of the valve member 35, the valve member 35 is pivotably mounted on the valve housing 5 by means of a pivot pin 47. Purely by way of example, it is provided that the pivot pin 47 is designed as a separate component and passes through a recess 48 in the carrier 36 which recess 48 is oriented transversely to the plane of representation of FIG. 1. Accordingly, a pivot axis 49 of the valve member 35, which is shown only symbolically, is also aligned transversely to the plane of representation of FIG. 1. The pivot pin 47 can be designed in particular as a circular cylindrical rod. The respective end regions of the pivot pin 47 engage in bearing recesses not shown in greater detail. These bearing recesses are located in the valve housing upper part 6 starting from the working space 26.

By way of example, it is provided that the first sealing section 50 and the second sealing section 51 rest on a first support surface 52 and a second support surface 53, respectively.

Purely by way of example, both the first support surface 52 and the second support surface 53 are flat and also are located in a common support plane 54. As can be seen from the illustration of FIGS. 1 and 6, the carrier 36 of the valve member 35 has a protrusion 55 which extends between the first support surface 52 and the second support surface 53 beyond the support plane 54. A protrusion surface 62 of the protrusion 55 has a distance 63 from the pivot pin 47 that is at least 50 percent of a diameter 64 of the pivot pin 47.

The protrusion 55 enables the pivot pin 47 to be arranged differently from the usual arrangement of pivot pins for valve members in valves known from the prior art. Due to the arrangement of the pivot pin 47 with respect to the deformation region 41, described in more detail below, a relatively small elastic deformation for the deformation region 41 of the flexible membrane 39 is ensured during a pivoting movement of the support member 36 about the pivot axis 49. Mainly, this small elastic deformation results in small transverse forces on the flexible membrane 39 in the closed position at the respective valve seat 21, 22 and thus achieves an optimum sealing effect with increased service life. Furthermore, undesirable tensile forces on the flexible membrane 39 are at least largely prevented, as can occur with a conventional arrangement of the pivot pin on the valve member and, in particular, lead to rapid wear of the flexible membrane.

As can be seen from the illustration of FIG. 1, the first valve seat 21 and the second valve seat 22 are each oriented at an angle with respect to the lower side region 43 and the upper side region 44. The inclined position for the first valve seat 21 and for the second valve seat 22 with respect to the lower side region 43 and the upper side region 44 is selected in such a way that the respective sealing section 50, 51 of the flexible membrane 39 is aligned parallel to the respective valve seat 21, 22 in the corresponding pivoted position of the valve member 35. This orientation of the first valve seat 21 and for the second valve seat 22 ensures a homogeneous and effective sealing between the flexible membrane 39 and the respective valve seat 21, 22.

By way of example, it is provided that, starting from the underside 38 of the carrier 36, a plurality of retaining webs 56 project from the flexible membrane 39 in the direction of the upper side 37 of the carrier 36, which retaining webs 56 each have a mushroom-shaped end region arranged remote from the underside 38. These retaining webs 56 are received in corresponding recesses 57 of the carrier 36 in a form-fitting manner and ensure reliable fixing of the deformation region 41 to the underside 38 of the carrier 36. A circumferential sleeve 58 integrally formed on the flexible membrane 39 and surrounds a circumferential outer peripheral surface 59 of the carrier 36 and which additionally serves to fix the flexible membrane 39 to the carrier 36.

Figures 2, 3:
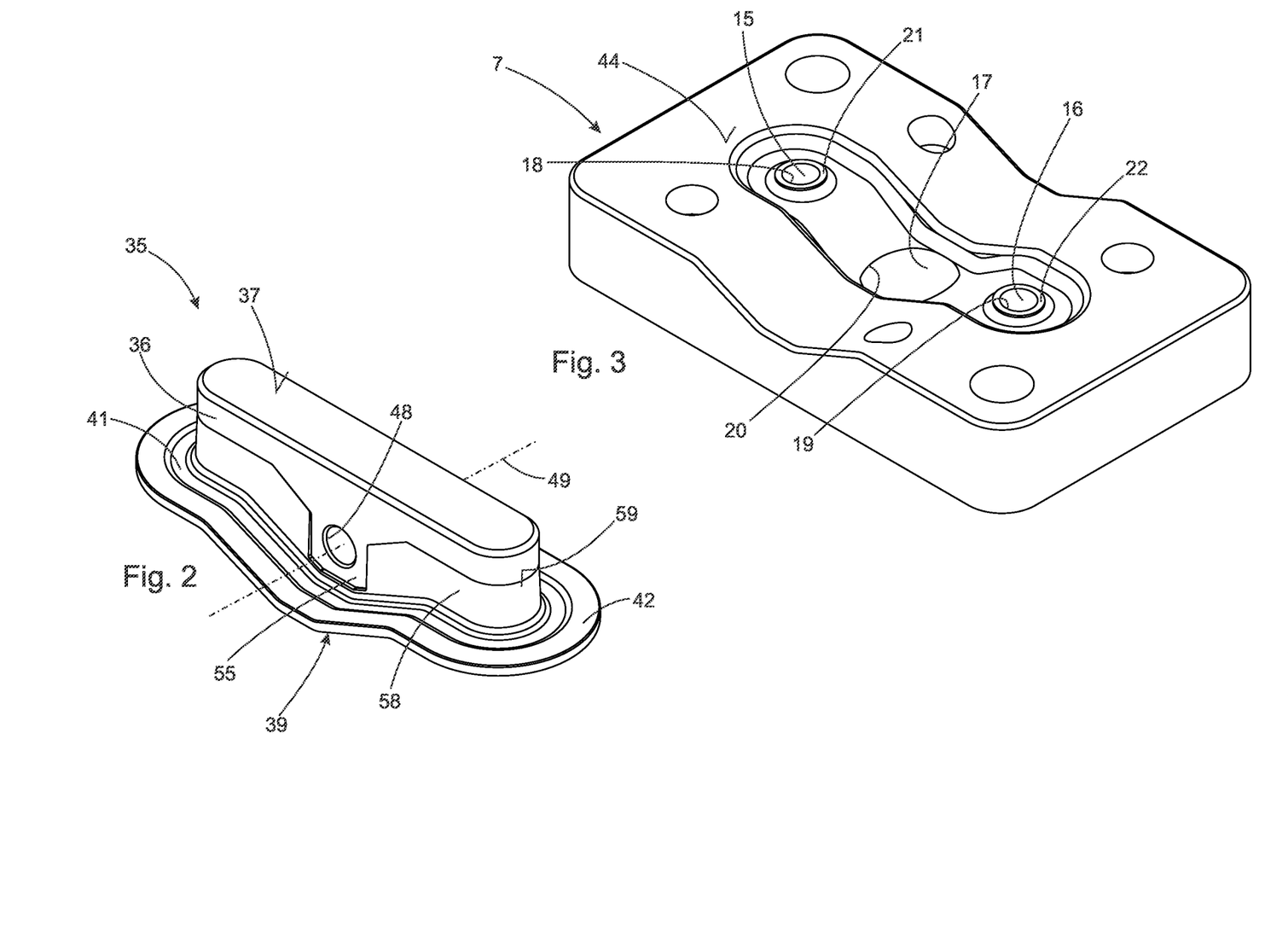

In FIG. 2, the valve member 35 is shown in a perspective view. FIG. 2 shows the deformation region 41, which is formed in the manner of a circumferential channel, the recess 48 for receiving the pivot pin 49 (which is not shown in FIG. 2), as well as the circumferential sleeve 58 and the fastening region 42 adjoining the deformation region 41 to the outside.

In the illustration of FIG. 3, which shows the valve housing lower part 7 in a perspective top view, the fluid bores 15, 16 and 17 as well as the annularly formed first valve seat 21 and the annularly formed second valve seat 22 are shown.

Figure 4:
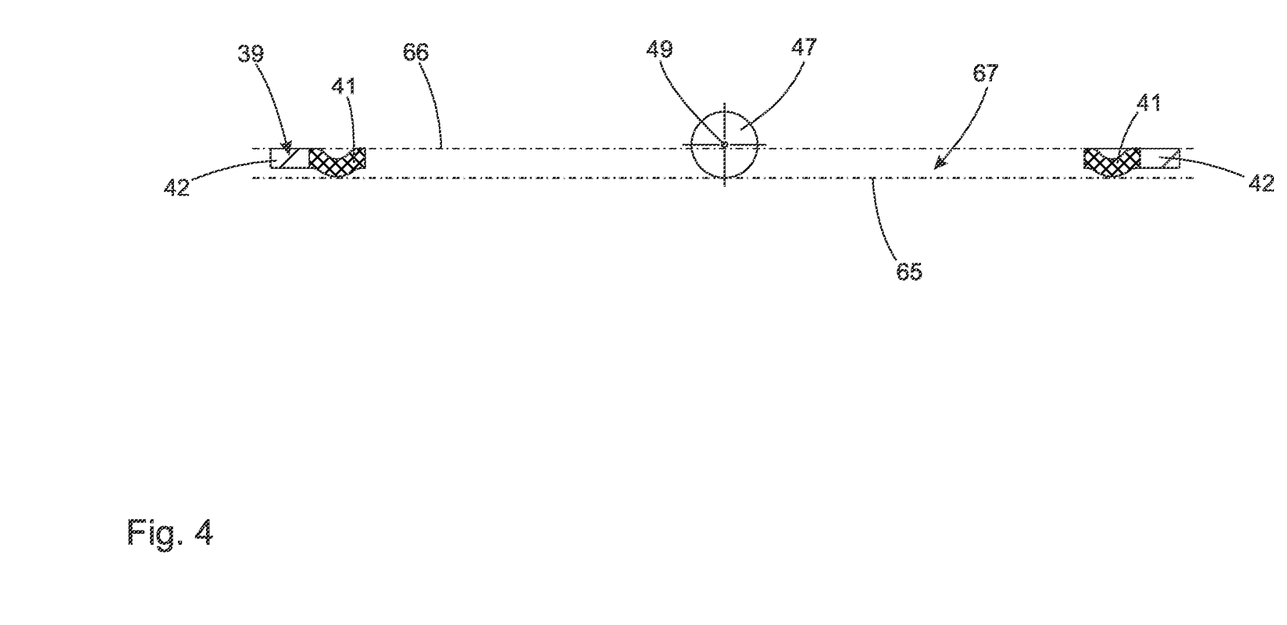

FIG. 4 shows, in addition to the pivot pin 47 of the valve member 35, the deformation region 41 (cross-hatched) and the fastening region 42 adjacent thereto. A lower deformation plane 65 and an upper deformation plane 66 delimit a deformation space 67 which intersects the pivot pin 47 according to the representation of FIG. 4. The lower deformation plane 65 is oriented parallel to the pivot axis 49 and is shown symbolized in FIG. 4, since it is aligned perpendicular to the view plane of FIG. 4. According to FIG. 1 the lower deformation plane 65 is arranged in such a way that it touches, but does not intersect, the deformation region 41 of the flexible membrane 39 on an underside facing away from the carrier 36. The upper deformation plane 66 is also aligned parallel to the pivot axis and contacts the deformation region 41 at an upper side facing the carrier 36 according to the embodiment of FIG. 1, without the upper deformation plane 66 intersecting the deformation region 41.

Figure 5:
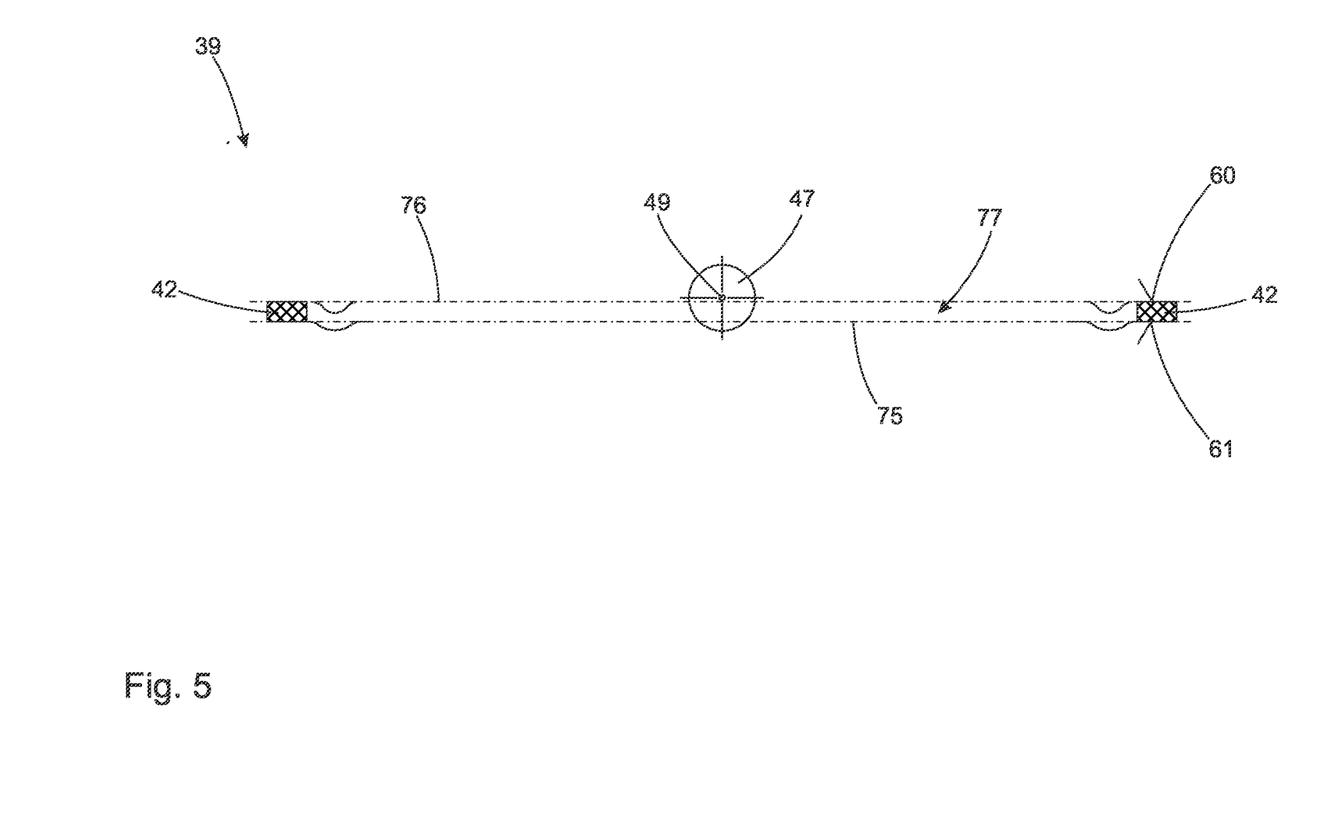

In the embodiment of FIG. 5, the same structures are shown as in FIG. 4. However FIG. 5 shows a mounting space bounded by a lower mounting plane 75 and an upper mounting plane 76. The lower fastening plane 75 contacts a lower side of the fastening region 42 (which is cross-hatched) facing away from the carrier 36 according to FIG. 1, while the upper fastening plane 76 contacts an upper side of the fastening region 42 facing the carrier 36 according to FIG. 1. It is further provided that the lower fastening plane 75 and the upper fastening plane 76 do not intersect the fastening region 42 and are each aligned parallel to the pivot axis 49.

Figure 6:
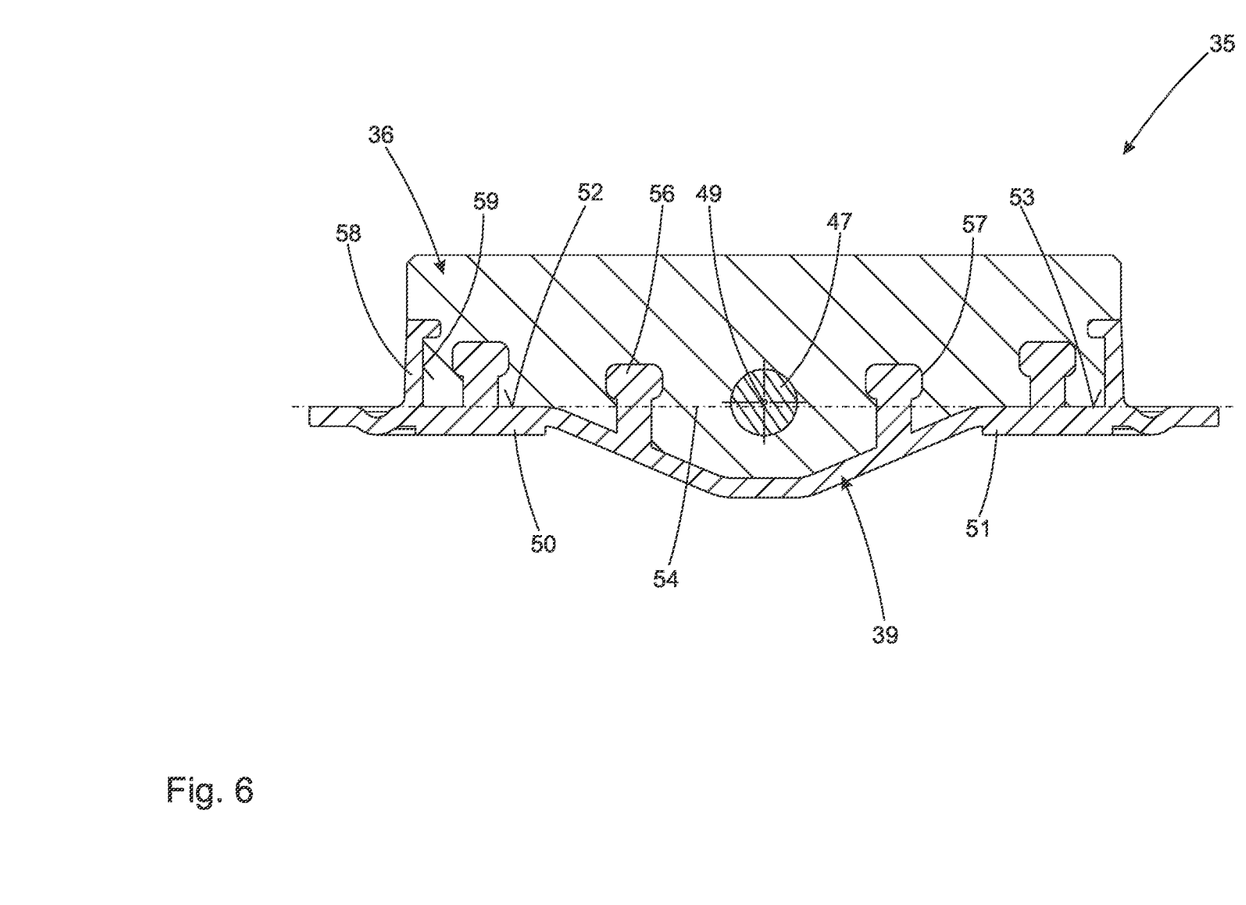

The illustration according to FIG. 6 shows the support plane 54 defined by the first support surface 52 on the support portion 36 and by the second support surface 53 on the support portion 36. The first support surface 52 is the region of the carrier 36 that lies immediately above the first sealing section 50 of the flexible membrane 39. Furthermore, the second support surface 53 is that region of the carrier 36 which lies directly above the second sealing section 51 of the flexible membrane 39. The support plane 54 is aligned parallel to the pivot axis 49 and intersects the pivot pin 47.

Figure 7:
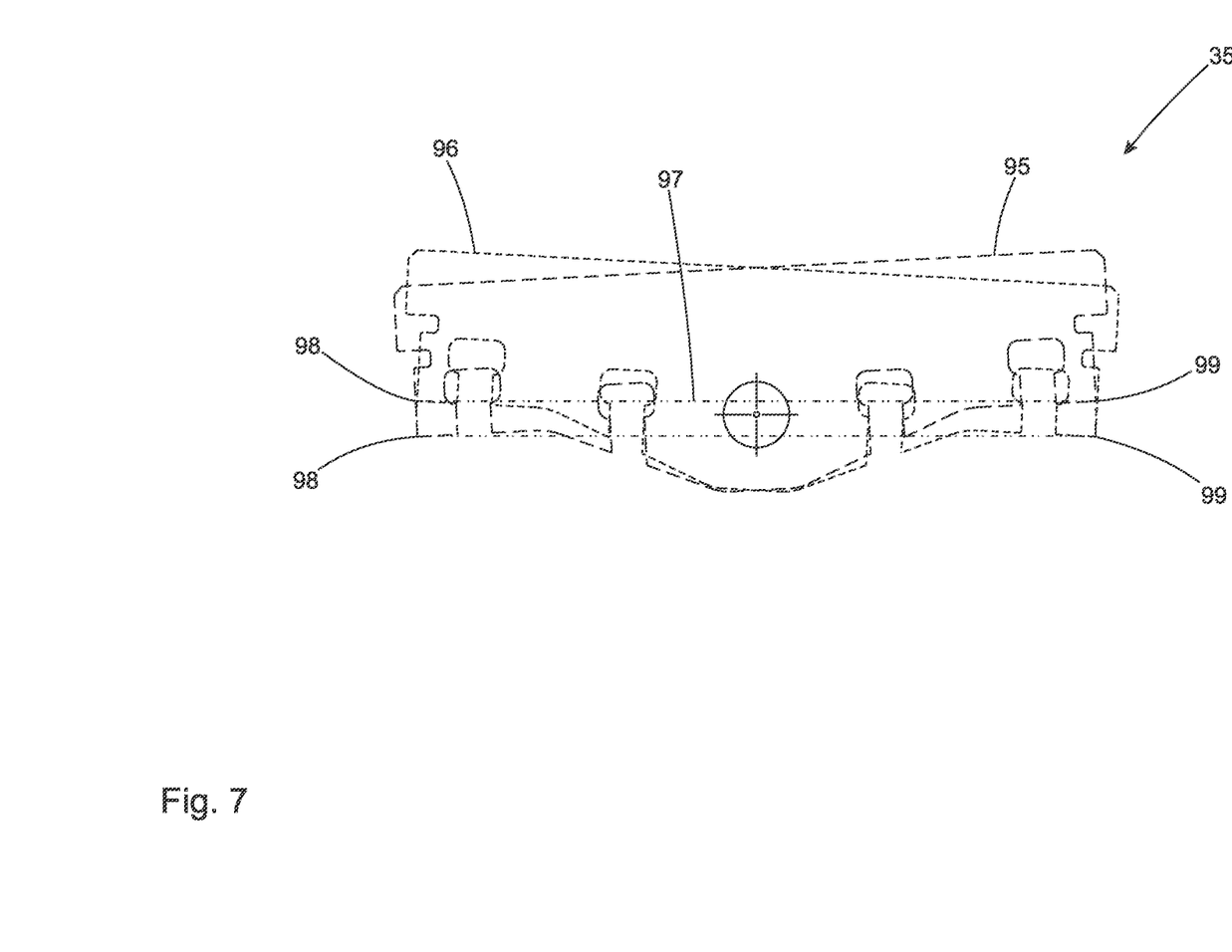

In FIG. 7, the carrier 36 is shown in a first sealing position 95 and in a second sealing position 96. To reach the respective pivot position the carrier 36 is pivoted, purely exemplarily, starting from the neutral position according to FIG. 1 by approx. 2 degrees respectively.

A movement space 97 with a rectangular profile according to FIG. 7 is defined by a first outer edge 98 of the carrier 36 and a second outer edge 99 of the carrier 36 in the two sealing positions 95 and 96. As can be seen from FIG. 7, the pivot pin 47 intersects the movement space 97.

Figure 8:
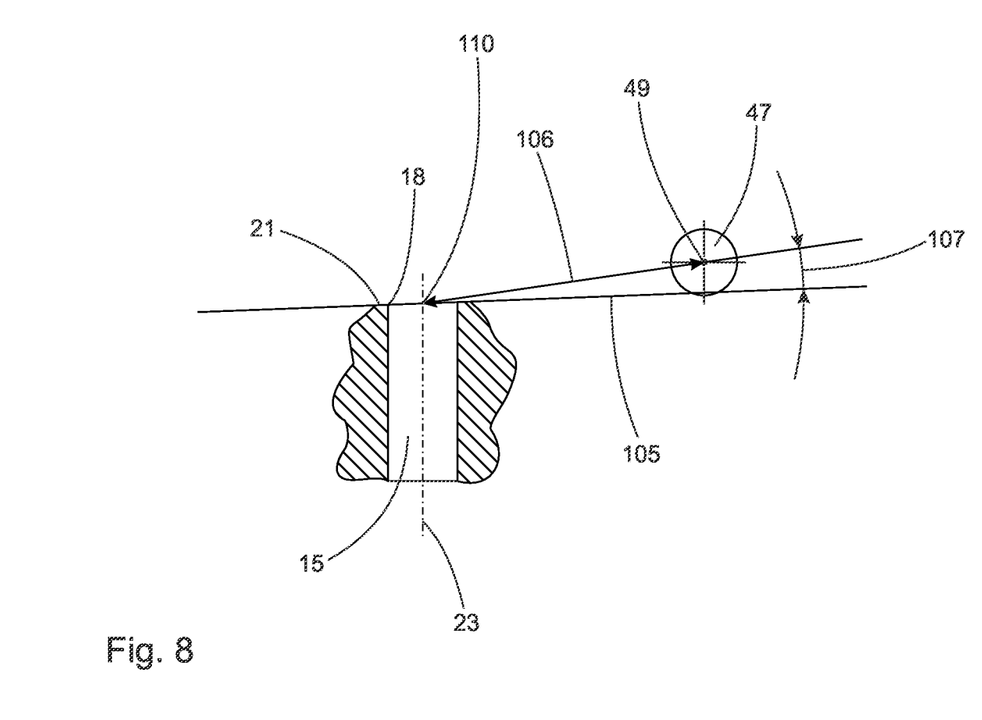

In FIG. 8, it is shown that a first orifice plane 105, which contacts the first valve seat 21, which is annular in shape according to FIG. 3, assumes an angle 107 with a straight line 106. The straight line 106 extends from the pivot axis 49 of the pivot pin 47 to an intersection 110, which can also be called a point of intersection) between the bore axis 23 (orifice center axis) and the orifice plane 105, which angle 107 is 7.5 degrees, purely by way of example. Furthermore the straight line 106 represents the distance between the intersection 110 and the pivot axis 49.

Figure 9:
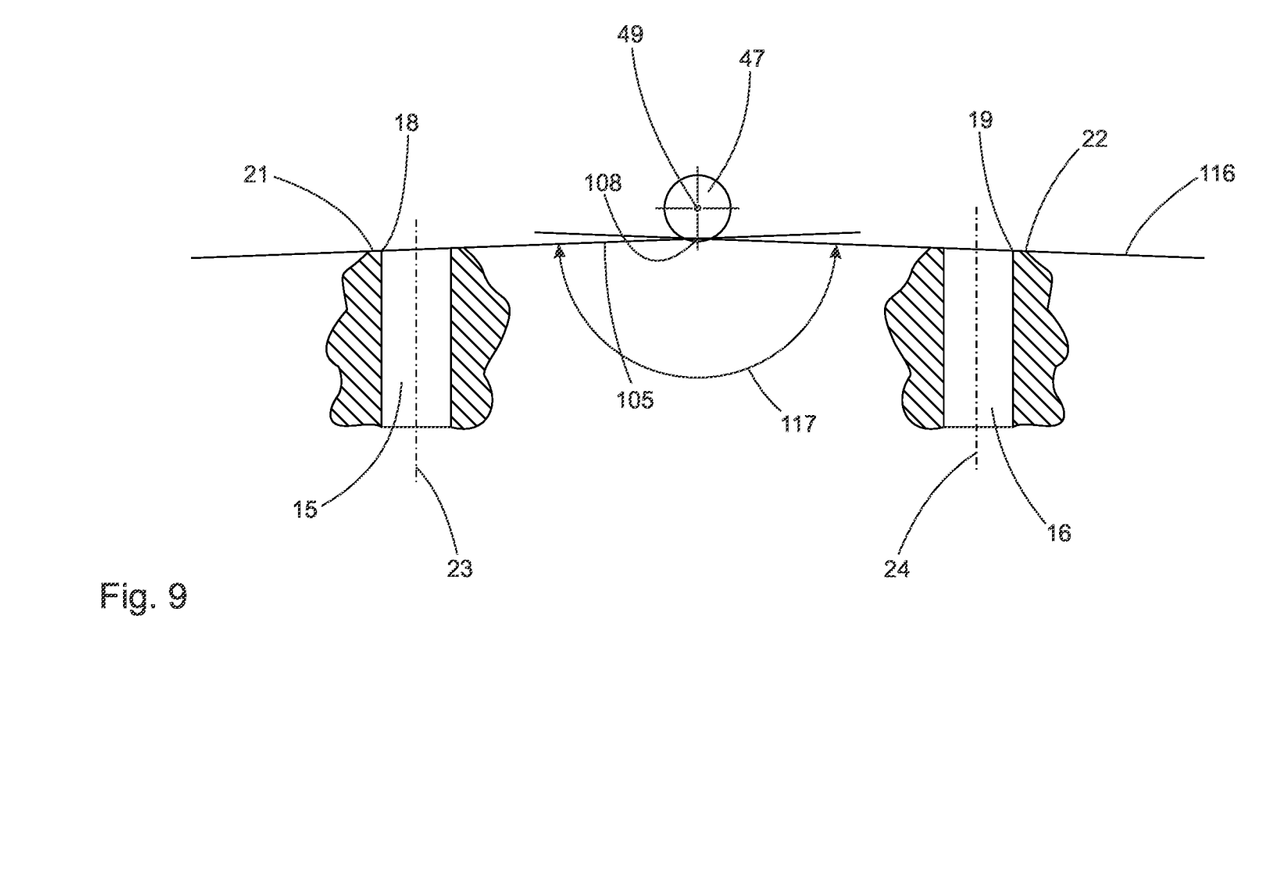

FIG. 9 shows that in addition to the first orifice plane 105, which is assigned to the first valve seat 21, a second orifice plane 116, which is assigned to the second valve seat 22. Exemplarily, it is provided that the first orifice plane 105 and the second orifice plane 116 enclose an obtuse angle 117 which, purely exemplarily, is 176 degrees.

From FIG. 9, it can be seen that the pivot pin 47 is arranged such that an intersection point 108 on a line of intersection, not shown, of the first orifice plane 105 with the second orifice plane 116 is arranged within a circular profile determined by the pivot pin 47, which is obtained by projecting the pivot pin 47 into the plane of representation serving as the plane of projection according to FIG. 9.

What is claimed is:

1. A valve for controlling a fluid flow, comprising a valve housing, which is provided with a first fluid connection and with a second fluid connection and with a fluid channel extending between the first fluid connection and the second fluid connection, further comprising a valve member, which is located in the fluid channel and which is pivotally mounted with a pivot pin in the valve housing, and with a drive for introducing a movement onto an upper side of the valve member, the valve member comprising a carrier and a flexible membrane which is fixed by a sealing region to an underside of the carrier, which underside is oriented opposite to the upper side of the carrier and which flexible membrane is connected to the valve housing by a circumferential fastening region, wherein a deformation region of the flexible membrane is formed between the sealing region and the circumferential fastening region of the flexible membrane, wherein the sealing region is provided for a sealing abutment against a valve seat which is located opposite to the underside of the carrier in the fluid channel, wherein the deformation region is arranged between a first deformation plane and a second deformation plane, the first deformation plane and the second deformation plane each being aligned parallel to a pivot axis determined by the pivot pin and delimiting a deformation space, and wherein the pivot pin is accommodated at least partially in the deformation space, wherein a first fastening plane adjoining an upper side of the circumferential fastening region and a second fastening plane adjoining a lower side of the circumferential fastening region delimit a fastening space, wherein the pivot pin is located in the fastening space or intersects with the fastening space.

2. The valve according to claim 1, wherein the sealing region of the flexible membrane comprises a sealing section which, in a sealing position of the valve member, is provided for sealing contact with the valve seat formed opposite the underside of the carrier in the fluid channel, wherein the sealing section is supported on a support surface of the carrier and wherein a support plane determined by the support surface of the carrier intersects the pivot pin.

3. The valve according to claim 1, wherein corner points of a movement space are determined by a first outer edge of the underside of the carrier in the sealing position and by the first outer edge in a release position and by a second outer edge of the underside of the carrier in the sealing position and by the second outer edge in the release position and wherein the pivot pin is located in the movement space or intersects the movement space.

4. A valve for controlling a fluid flow, comprising a valve housing, which is provided with a first fluid connection and with a second fluid connection and with a fluid channel extending between the first fluid connection and the second fluid connection, further comprising a valve member, which is located in the fluid channel and which is pivotally mounted with a pivot pin in the valve housing, and with a drive for introducing a movement onto an upper side of the valve member, the valve member comprising a carrier and a flexible membrane which is fixed by a sealing region to an underside of the carrier, which underside is oriented opposite to the upper side of the carrier and which flexible membrane is connected to the valve housing by a circumferential fastening region, wherein a deformation region of the flexible membrane is formed between the sealing region and the circumferential fastening region of the flexible membrane, wherein the sealing region is provided for a sealing abutment against a valve seat which is located opposite to the underside of the carrier in the fluid channel, wherein the deformation region is arranged between a first deformation plane and a second deformation plane, the first deformation plane and the second deformation plane each being aligned parallel to a pivot axis determined by the pivot pin and delimiting a deformation space, and wherein the pivot pin is accommodated at least partially in the deformation space, wherein an orifice of the valve seat determines an orifice plane and wherein a straight line which extends from an intersection of a central axis of the orifice with the orifice plane to the pivot axis of the carrier assumes an angle with respect to the orifice plane which angle is smaller than 30 degrees.

5. The valve according to claim 4, wherein the fluid channel is delimited by a valve housing upper part and by a valve housing lower part and wherein the valve seat and a second valve seat are arranged in the valve housing lower part and wherein a third fluid connection is located between the valve seat and the second valve seat and extends through the valve housing lower part starting from the fluid channel.

6. The valve according to claim 4, wherein a first sealing section and a second sealing section are formed on the underside of the carrier and are located in a common sealing plane and wherein a protrusion is formed between the first sealing section and the second sealing section, which protrusion projects above the common sealing plane and which defines a protrusion surface, wherein a distance between the protrusion surface and the pivot pin is at least 50 percent of a diameter of the pivot pin.

7. The valve according to claim 1, wherein the valve seat and a second valve seat are formed in the fluid channel, wherein a first orifice of the valve seat defines a first orifice plane and wherein a second orifice of the second valve seat defines a second orifice plane and wherein an intersection line of the first orifice plane and the second orifice plane is located within a cross section of the pivot pin.

8. The valve according to claim 1, wherein the carrier comprises at least one recess which extends from the underside of the carrier in the direction of the upper side of the carrier and wherein the flexible membrane comprises a retaining web which is received in the recess and/or wherein the flexible membrane comprises a circumferential sleeve which extends from the underside of the carrier in the direction of the upper side of the carrier.

9. The valve according to claim 1, wherein the fastening region bears against a lower side region of a valve housing upper part and against an oppositely arranged upper side region of a valve housing lower part and is received between the lower side region and the upper side region in a force-fitting manner or in a force-fitting and form-fitting manner.

10. A valve for controlling a fluid flow, comprising a valve housing, which is provided with a first fluid connection and with a second fluid connection and with a fluid channel extending between the first fluid connection and the second fluid connection, further comprising a valve member, which is located in the fluid channel and which is pivotally mounted with a pivot pin in the valve housing, and with a drive for introducing a movement onto an upper side of the valve member, the valve member comprising a carrier and a flexible membrane which is fixed by a sealing region to an underside of the carrier, which underside is oriented opposite to the upper side of the carrier and which flexible membrane is connected to the valve housing by a circumferential fastening region, wherein a deformation region of the flexible membrane is formed between the sealing region and the circumferential fastening region of the flexible membrane, wherein the sealing region is provided for a sealing abutment against a valve seat which is located opposite to the underside of the carrier in the fluid channel, wherein an orifice of the valve seat determines an orifice plane and wherein a straight line, which extends from an intersection of a central axis of the orifice with the orifice plane to a pivot axis of the carrier, assumes an angle with respect to the orifice plane which angle is smaller than 30 degrees, wherein a first sealing section and a second sealing section are formed on the underside of the carrier and are located in a common sealing plane and wherein a protrusion is located between the first sealing section and the second sealing section, which protrusion projects above the common sealing plane and which defines a protrusion surface, wherein a distance between the protrusion surface and the pivot pin is at least 50 percent of a diameter of the pivot pin.

11. The valve according to claim 10, wherein the fluid channel is delimited by a valve housing upper part and by a valve housing lower part and wherein the valve seat and a second valve seat are arranged in the valve housing lower part and wherein a third fluid connection is located between the valve seat and the second valve seat and extends through the valve housing lower part starting from the fluid channel.

12. The valve according to claim 10, wherein the carrier comprises at least one recess which extends from the underside of the carrier in the direction of the upper side of the carrier and wherein the flexible membrane comprises at least one retaining web which is received in the recess and/or wherein the flexible membrane comprises a circumferential sleeve which extends from the underside of the carrier in the direction of the upper side of the carrier.

13. The valve according to claim 10, wherein the fastening region bears against a lower side region of a valve housing upper part and against an oppositely arranged upper side region of a valve housing lower part and is received between the lower side region and the upper side region in a force-fitting manner or in a force-fitting and form-fitting manner.

* * * * *